(12) United States Patent
Yamaguchi et al.

(10) Patent No.: US 7,389,838 B2
(45) Date of Patent: Jun. 24, 2008

(54) HYBRID POWERED VEHICLE

(75) Inventors: Koichi Yamaguchi, Tokyo (JP); Seiichi Yamaguchi, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 164 days.

(21) Appl. No.: 10/994,670

(22) Filed: Nov. 23, 2004

(65) Prior Publication Data

US 2005/0115751 A1 Jun. 2, 2005

(30) Foreign Application Priority Data

Dec. 1, 2003 (JP) ............................ 2003-401590

(51) Int. Cl.
*B60K 1/00* (2006.01)

(52) U.S. Cl. ...................... 180/65.2; 903/941; 903/942; 903/943

(58) Field of Classification Search ................ 180/65.2, 180/65.3, 65.4; 701/22; 903/941, 942, 943
See application file for complete search history.

(56) References Cited

U.S. PATENT DOCUMENTS

| | | | | |
|---|---|---|---|---|
| 4,335,429 A | * | 6/1982 | Kawakatsu | ................. 701/102 |
| 4,407,132 A | * | 10/1983 | Kawakatsu et al. | ............ 60/716 |
| 5,806,617 A | * | 9/1998 | Yamaguchi | ................. 180/65.2 |
| 5,955,865 A | | 9/1999 | Koike et al. | |
| 6,173,574 B1 | * | 1/2001 | Obayashi et al. | ............... 60/710 |
| 6,369,531 B1 | * | 4/2002 | Oshima et al. | ............... 318/139 |
| 6,484,833 B1 | * | 11/2002 | Chhaya et al. | ............. 180/65.4 |
| 6,687,581 B2 | * | 2/2004 | Deguchi et al. | ................ 701/22 |
| 6,694,232 B2 | * | 2/2004 | Saito et al. | ..................... 701/22 |

FOREIGN PATENT DOCUMENTS

| | | |
|---|---|---|
| JP | 8-294205 | 11/1996 |
| JP | 10-14003 | 1/1998 |
| JP | 10-23608 | 1/1998 |

\* cited by examiner

*Primary Examiner*—Frank Vanaman
(74) *Attorney, Agent, or Firm*—Pillsbury Winthrop Shaw Pittman, LLP

(57) ABSTRACT

Load sharing rates of an internal combustion engine and an electric motor of a hybrid powered vehicle are definitely controlled to improve fuel efficiency of the vehicle during an auxiliary running with using power of the electric motor together with power of the internal combustion engine when a pressing amount of an accelerator pedal of the vehicle is small. In response to a pressing amount information of the accelerator pedal inputted to a hybrid control circuit, the hybrid control circuit calculates the load sharing rates of the internal combustion engine and the electric motor by referring to a preliminarily set control map and controls the motor according to its load sharing rate. The hybrid control circuit sends an electric signal corresponding to the load sharing rate of the internal combustion engine to the internal combustion engine control circuit, instead of the pressing amount information of the accelerator pedal.

1 Claim, 2 Drawing Sheets

HYBRID POWERED VEHICLE

BACKGROUND OF THE INVENTION

1. Field of the Invention

The present invention relates to an improvement of a drive force sharing control of a hybrid powered vehicle, which utilizes motive power of an internal combustion engine in combination with power of an electric motor. In particular, the present invention relates to an improvement of a sharing control of load shares of an internal combustion engine and an electric motor of a hybrid powered vehicle for a required drive force of the vehicle by controlling a ratio of a load sharing of the electric motor to that of the internal combustion engine according to a pressing amount of an accelerator pedal of the vehicle to economize fuel consumption of the hybrid powered vehicle.

2. Description of Related Art

When a running state of a usual hybrid powered vehicle, which includes an internal combustion engine and an electric motor, is in a start mode, an acceleration mode or a hill clamming mode, in which a larger drive force, the hybrid powered vehicle is usually set to an auxiliary acceleration mode to use the electric motor to generate a drive force to be added to a drive force of the internal combustion engine. In such case, the internal combustion engine, which utilizes liquid fuel, and the electric motor, which utilizes electric power, generate drive forces respectively correspondingly to a pressing amount of an accelerator pedal of the hybrid powered vehicle operated by a driver to share loads necessary to achieve the running mode.

In such conventional hybrid powered vehicle, an output signal of an acceleration sensor of the hybrid powered vehicle corresponding to the pressing amount of the accelerator pedal is usually supplied to both an internal combustion engine control circuit for controlling a flow rate of fuel to be supplied to the internal combustion engine and a hybrid control circuit for controlling an electric current to be supplied to the electric motor, in parallel. The internal combustion engine control circuit and the hybrid control circuit generate control outputs, according to respective control logics thereof. The pressing amount of the accelerator pedal operated by the driver corresponds to a mere comprehensive output power of the internal combustion engine and the electric motor. The driver may further press the accelerator pedal if he wishes to accelerate the vehicle further or release the accelerator pedal if he wishes to decelerate the vehicle. Therefore, in the conventional hybrid powered vehicle, the control circuit for the internal combustion engine and the control circuit for the electric motor of the conventional hybrid powered vehicle are constructed such that each of these control circuits controls the acceleration and the deceleration of the vehicle independently of the other.

Consequently, although the comprehensive drive force outputted by the internal combustion engine and the electric motor corresponds to the pressing amount of the accelerator pedal at a time when the accelerator pedal is operated by the driver, load required at that time and shared by the internal combustion engine and the electric motor are not determined constantly. That is, for example, the power control responsive to an operation input corresponding to the pressing amount of accelerator pedal includes a hysteresis and the hysteresis characteristics of the internal combustion engine is different from that of the electric motor. Therefore, even if the accelerator pedal is being pressed to a certain specific amount, the load sharing rates of the internal combustion engine and the electric motor are varied upon a changing history of the depression amount of the accelerator pedal before the certain specific pressing amount of the accelerator pedal is achieved.

The above mentioned fact that the load sharing rates of the internal combustion engine and the electric motor are not determined constantly with respect to the constant pressing amount of the accelerator pedal is caused by not only the hysteresis characteristics of the internal combustion engine control circuit and the hybrid control circuit but also various other phenomena. For example, the other phenomena may include a temperature of the internal combustion engine, a charging rate of a storage battery for supplying current to the electric motor and a pressing speed of the accelerator pedal. As such, in the conventional control device, the load sharing rates of the internal combustion engine and the electric motor with respect to the pressing amount of the accelerator pedal are always varied according to changes of such various factors as mentioned above.

Response characteristics of an internal combustion engine and an electric motor to the pressing amount of the accelerator pedal are disclosed in JP H10-23608A and JP H08-294205A.

It has been found by the inventors of the present invention that, if the load sharing rates of the internal combustion engine and the electric motor with respect to the pressing amount of the accelerator pedal is not determined constantly, it may be impossible to make the performance of the hybrid powered vehicle best. That is, the most important feature of the hybrid powered vehicle is to ensure that the fuel consumption per unit running distance is as small as possible. In order to use this feature practically, it is necessary to maintain the charging rate of the storage battery as high as possible by charging the storage battery by means of regenerative braking during deceleration and to increase the rate of auxiliary motor running during acceleration. In order to increase the rate of auxiliary motor running during acceleration, it is necessary to execute a control for increasing the rate of auxiliary motor running as much as possible.

As a result of detailed investigation of this matter of a hybrid powered vehicle having conventional design conducted by the inventors, it has been found that, in a region in which the pressing amount of the accelerator pedal is one third of the full pressing or smaller, that is, a comprehensive output torque of the vehicle is small, the load sharing rates of the internal combustion engine and the electric motor are varied considerably due to various influences. Therefore, even if the hybrid powered vehicle is designed in such a way that efficiencies of the internal combustion engine and the electric motor become optimal with respect to drive forces generated thereby, the load sharing of the internal combustion engine is increased and the comprehensive fuel efficiency of the hybrid powered vehicle is degraded when the load sharing rates become inadequate.

SUMMARY OF THE INVENTION

The present invention was made in view of the above mentioned state of art and an object of the present invention is to provide a hybrid powered vehicle capable of optimally controlling the load sharing rates of an internal combustion engine and an electric motor of the hybrid powered vehicle.

Another object of the present invention is to improve the fuel consumption of a hybrid powered vehicle, in particular, in a region in which the pressing amount of an accelerator pedal is small.

A further object of the present invention is to improve fuel consumption rate correspondingly to a charging rate of a storage battery in a region, in which a pressing amount of an accelerator pedal is small.

In order to achieve the above objects, the present invention is featured by that, in a hybrid powered vehicle including an internal combustion engine control circuit for controlling an internal combustion engine and a hybrid control circuit for controlling an electric motor, the pressing amount information of an accelerator pedal is supplied to the hybrid control circuit. In the hybrid control circuit, load sharing rates of the electric motor and the internal combustion engine are set by referring to a control map, which is preliminarily set, and the hybrid control circuit and the internal combustion engine control circuit control outputs of the internal combustion engine and the electric motor according to the load sharing rates, respectively. The control map is set by referring to the charging rate of a storage battery at that time in such a way that the load sharing of the electric motor becomes as much as possible. The hybrid control circuit controls the output of the electric motor according to the sharing rate of the electric motor and transmits an electric signal indicative of the pressing amount of the accelerator pedal through a system, which is similar to that of the pressing amount of the accelerator pedal, to the internal combustion engine control circuit, according to the load sharing rate of the internal combustion engine.

That is, according to the present invention, the hybrid powered vehicle comprises the internal combustion engine, the internal combustion engine control circuit for controlling the flow rate of fuel to be supplied to the internal combustion engine, the electric motor having a rotary shaft connected to a rotary shaft of the internal combustion engine, a storage battery, an inverter circuit for electrically coupling the storage battery to the electric motor and a hybrid control circuit for controlling the inverter. The pressing amount information of an accelerator pedal is supplied to the hybrid control circuit as an electric signal and the hybrid control circuit includes calculation means for calculating the load sharing rates of the internal combustion engine and the electric motor on the basis of the pressing amount information of the accelerator pedal and means for sending information corresponding to the load sharing rate of the internal combustion engine, which is calculated by the calculating means, from the hybrid control circuit to the internal combustion engine control circuit.

The load sharing rate information is preferably transmitted as an electric signal similar to that of the pressing amount information of the accelerator pedal.

The hybrid control circuit preferably comprises recognition means for recognizing the charging rate of the storage battery and a control map for changing the load sharing rate of the electric motor according to the charging rate of the storage battery, which is recognized by the recognition means.

The inverter control circuit preferably comprises means for controlling the load sharing rate of the electric motor to a possible maximum value in a region, in which the pressing amount of the accelerator pedal is smaller than a predetermined value, when the charging rate of the storage battery is higher than a predetermined value.

According to the present invention, it is possible to control the internal combustion engine and the electric motor in such a way that the load sharing rates thereof are not changed with respect to a comprehensive output of the internal combustion engine and the electric motor, which is determined by the pressing amount of the accelerator pedal. Therefore, the load sharing rates are controlled to optimal values at every time point, so that the comprehensive fuel consumption is improved. Particularly, in the region in which the pressing amount of acceleration pedal is small, the fuel efficiency (litter/km) is substantially improved by appropriately setting the load sharing rates correspondingly to the charging rate of the storage battery.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
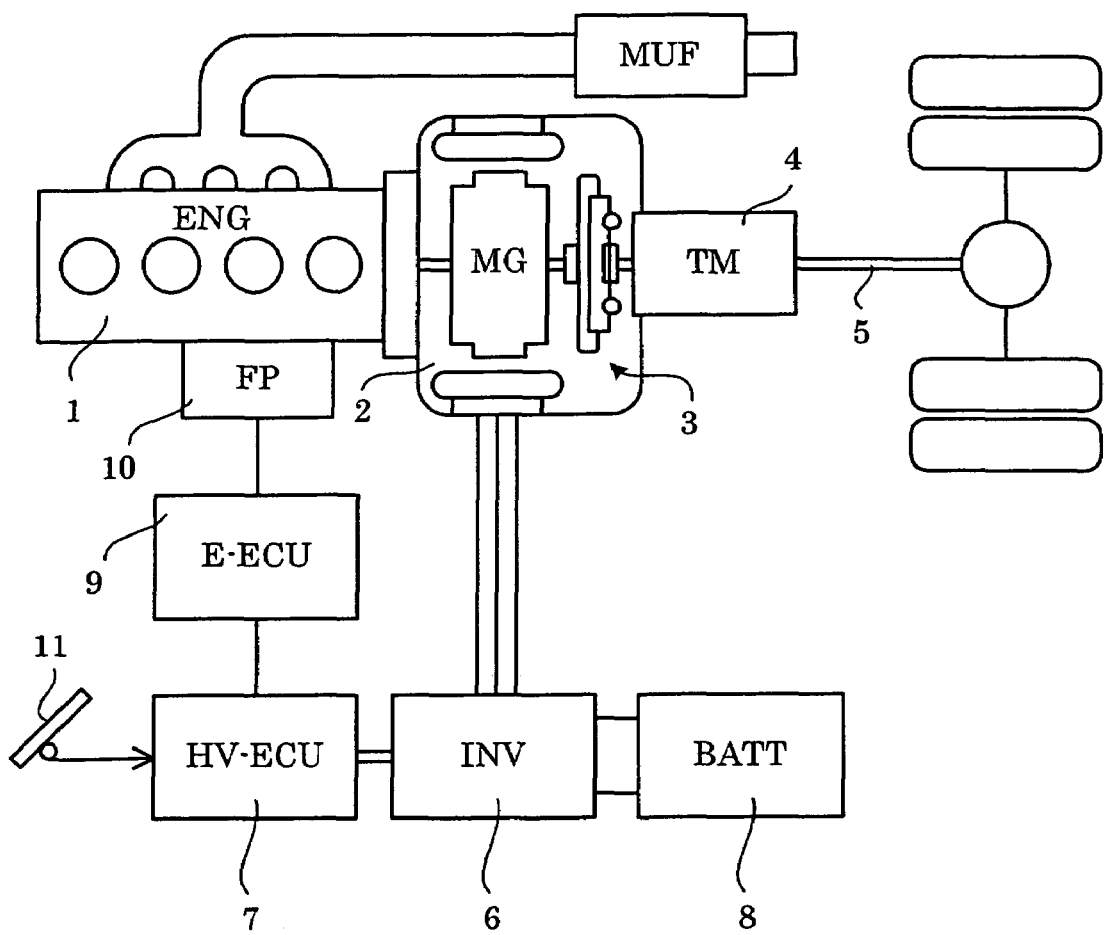
FIG. 1 is a block diagram of a hybrid powered vehicle according to an embodiment of the present invention.

FIG. 1 is a block diagram showing a construction of an embodiment of a hybrid powered vehicle according to the present invention. Describing the whole construction of the embodiment, an output shaft of an internal combustion engine 1 is fixedly connected to a rotary shaft of a motor-generator 2. The motor-generator 2 is a single rotary machine, which works as an electric motor or a generator according to an operation mode thereof. The term "electric motor" in this description means one of two operation modes of the motor-generator 2. That is, the motor-generator 2 works as the electric motor in response to a three-phase AC current supplied to a field winding of the motor-generator 2 when a rotation rate of a rotating magnetic field generated by the field winding is higher than a rotation rate of a mechanical rotary shaft of the motor-generator. The three-phase AC current is obtained by inverting a DC current from a storage battery 8 by means of an inverter 6. The motor-generator works as the generator when the rotation rate of the rotating magnetic field formed by the three-phase AC current supplied to the field winding of the motor-generator 2 is lower than the rotation rate of the rotary shaft of the motor-generator 2. An AC current outputted from the generator is inverted into a DC current by the inverter 6 to charge the storage battery 8. The rotation rate of the rotating magnetic field, that is, the frequency of the three-phase AC current, is controlled by a hybrid control circuit 7. The hybrid control circuit 7 is constructed with a program control circuit.

A clutch 3 has an input shaft connected to the rotary shaft of the motor-generator 2. The operating state of the clutch 3, which includes a half clutch state, that is, a state in which the clutch is loosely thrown in by half to allow it to slip, is controlled by a clutch actuator, which is not shown in FIG. 1. A change gear 4 has an input shaft connected to an output shaft of the clutch 3. The change gear 4 is operated under control of a change gear controller, which is not shown in FIG. 1. The change gear 4 may be any well known change gear capable of setting either one of gear positions including a neutral position, 5 forward positions and a reverse position. An output shaft of the change gear 4 is coupled with a propeller shaft 5 of the hybrid powered vehicle. The clutch actuator and the change gear control device are controlled according to operations of an accelerator pedal 11 and a change lever, which are provided in a driving seat of the vehicle. Since this control is well known, detailed description thereof is omitted.

The field winding of the motor-generator 2 is constructed such that the rotating magnetic field is formed by the three-phase AC current as mentioned previously. Input terminals of the motor-generator for receiving the three-phase AC current are electrically connected to AC side terminals of the inverter 6. Phase rotation angle of the inverter 6 is controlled by the hybrid control circuit (HV-ECU) 7 constructed with the program control circuit. The storage battery 8 is connected to DC side terminals of the inverter 6. Although not shown in FIG. 1 for simplicity of illustration, electric signals indicative of a rotation information of the internal combustion engine (or the motor-generator), a clutch state information, a position information of the change gear, a vehicle speed information, a pressing amount information of the accelerator pedal, a pressing information of a brake pedal and a charging rate information of the storage battery, etc., are inputted to the hybrid control circuit 7 as input information. Further, the hybrid control circuit 7 is communicated with other program control circuits such as an internal combustion engine control circuit, a clutch control circuit, a change gear control circuit, an exhaust braking control circuit, etc., provided in the vehicle through a communication bus, so that these control circuits can share the control information.

A fuel pump 10 is provided for the internal combustion engine 1. The fuel pump 10 is controlled by the internal combustion engine control circuit (E-ECU) 9. The electric signal corresponding to the pressing amount information of the accelerator pedal 11 is supplied to not the internal combustion engine control circuit 9 but the hybrid control circuit 7. This construction is the feature of the present invention and will be described in more detail.

Since the power system of the hybrid powered vehicle has a well known structure, its operation will be described briefly. When the hybrid control circuit 7 determines, on the basis of the various information inputted to the hybrid control circuit 7, that the hybrid powered vehicle is in an acceleration mode, the hybrid control circuit 7 controls the rotating magnetic field of the field winding of the motor-generator 2 in such a way that the rotation rate of the revolving magnetic field becomes higher than the mechanical rotation rate of an armature of the motor-generator. Therefore, the motor-generator 2 works as the motor to accelerate the vehicle by utilizing electric energy stored in the storage battery 8. This operating mode is the auxiliary acceleration mode.

When the vehicle becomes in the deceleration state, particularly, when the vehicle becomes in the engine braking mode, the hybrid control circuit 7 controls the rotating magnetic field of the field winding of the motor-generator 2 in such a way that the rotation rate of the rotating magnetic field becomes lower than the mechanical rotation rate of the armature of the motor-generator. Thus, the motor-generator 2 works as the generator. In such case, electric energy generated by rotation of the propeller shaft 5 is converted into DC current by the inverter and the storage battery 8 is charged by the DC current. This operation mode is the regenerative brake mode.

Describing the operation of the hybrid powered vehicle, which characterizes the present invention, the electric signal indicative of the pressing amount information of the accelerator pedal 11 is supplied to not the internal combustion engine control circuit 9 but the hybrid control circuit 7. The hybrid control circuit 7, which always monitors the charging rate of the storage battery 8, is the program control circuit and controls the motor-generator by referring to the charging rate of the storage battery 8.

Assuming that the accelerator pedal of the hybrid powered vehicle is pressed and the vehicle enters into the acceleration mode with the charging rate of the storage battery being in a condition better than a predetermined condition, the hybrid control circuit 7 controls the electric motor in such a way that the maximum auxiliary acceleration is executed by the storage battery starting from a time at which the pressing amount of the accelerator pedal is small. That is, the motor-generator 2 is controlled as the motor and a large current is supplied to the motor-generator 2 by referring a control map, which is preliminarily set. And, an electric signal corresponding to a torque, which is to be generated by the internal combustion engine 2 and can not be covered by an output torque of the motor-generator 2, is sent to the internal combustion engine control circuit 9.

Figure 2:
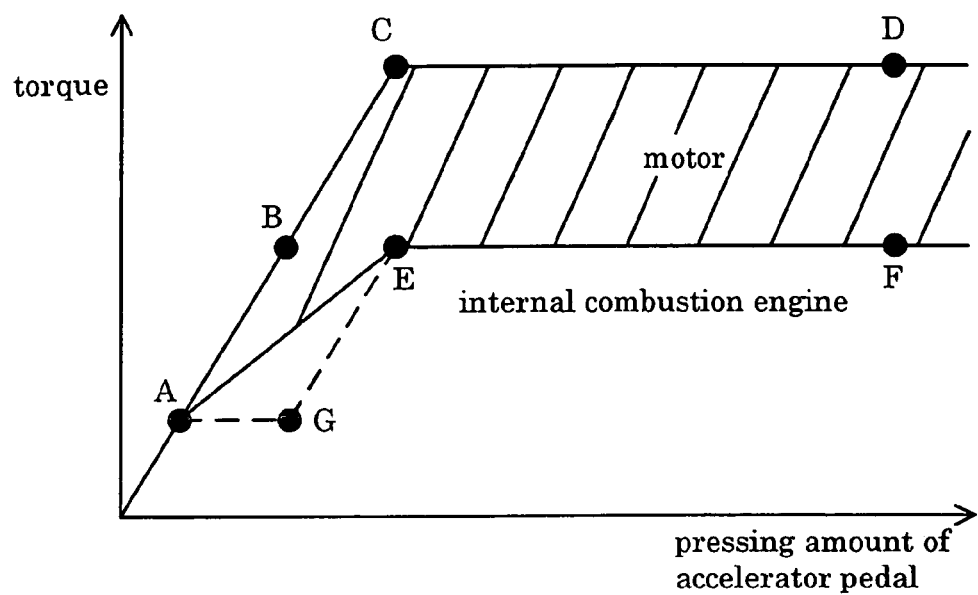
FIG. 2 is a graph showing an example of a control map utilized in the hybrid powered vehicle shown in FIG. 1.

FIG. 2 shows an example of the control map for controlling the hybrid powered vehicle. A control operation curve in the control map is set when the vehicle starts to run. In FIG. 2, abscissa indicates the pressing amount of the accelerator pedal of the vehicle and ordinate indicates the output torque of an internal combustion engine of the vehicle. Required output torque of the internal combustion engine is changed along a line A-B-C-D with increase of the pressing amount of the accelerator pedal. When the charging rate of the storage battery is high enough, the motor takes a portion of the required torque, which is shown by a hatched area in FIG. 2, in its charge. In such case, the hybrid control circuit 7 sends not an electric signal of the pressing amount of the accelerator pedal but a signal corresponding to a torque change A-E-F shown in FIG. 2 to the internal combustion engine control circuit 9 correspondingly to the pressing amount of the accelerator pedal. Further, when it is possible to increase the torque to be shared by the motor in view of the characteristics of the motor, the internal combustion engine can be controlled along a line A-G-E-F shown in FIG. 2 by increasing the output torque of the motor.

In this manner, the output torque of the internal combustion engine 1 can be reduce over the whole pressing range of the accelerator pedal and the most effective auxiliary drive is maintained by the motor-generator 2. That is, according to the present invention, it becomes possible to increase the charge of the auxiliary running taken by the motor according to the pressing amount of the accelerator pedal to thereby definitely control the auxiliary running charge taken by the electric motor.

When the charging rate of the storage battery 8 is not enough to execute the auxiliary running, the hybrid control circuit 7 does not set the auxiliary running mode and, instead thereof, the hybrid control circuit 7 sends an electric signal corresponding to the torque, which changes along the line A-B-C-D, to the internal combustion engine control circuit 9 according to the pressing amount of the accelerator pedal. That is, in this case, the pressing information of the accelerator pedal inputted to the hybrid control circuit is transmitted to the internal combustion engine control circuit 9 as it is.

Although the present invention has been described for two auxiliary running modes of the motor in one of which the charging rate of the storage battery 8 is enough to realize the maximum auxiliary running of the hybrid powered vehicle by the storage battery and in the other of which the charging rate of the storage battery 8 is not enough to realize the maximum auxiliary running of the vehicle, it is practically preferable to set three or more auxiliary running modes (for example, 3 to 4 modes) correspondingly to respective charging rates of the storage battery. That is, it is possible to set the rate of the auxiliary running in each of the running modes by providing a corresponding number of control maps, which have different torque ranges (hatched range in FIG. 2) to be covered by the motor, correspondingly to the respective running modes and by using one of the control maps according to a certain charging rate of the storage battery.

Figure 3:
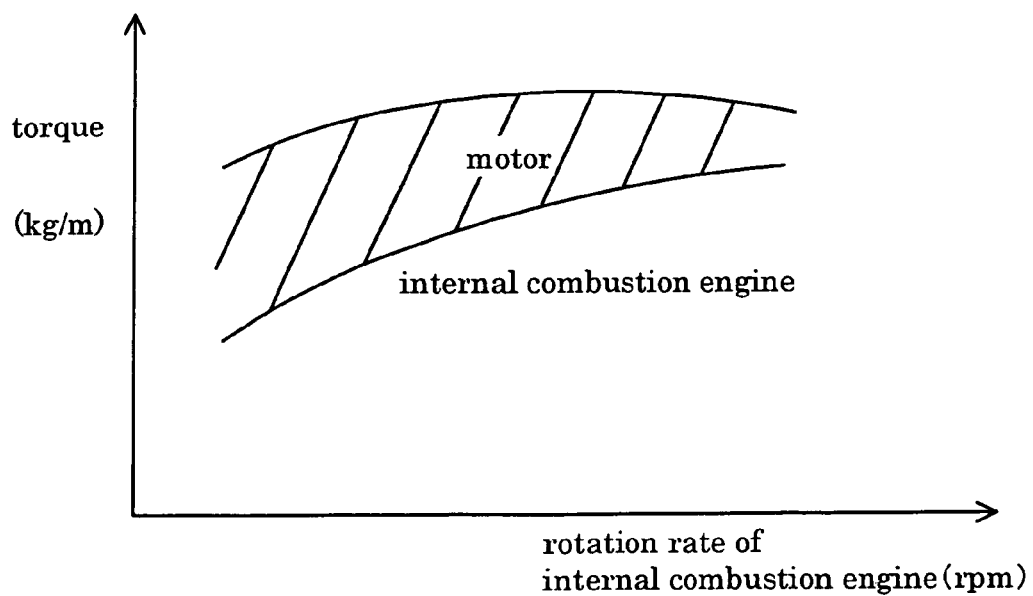
FIG. 3 is a graph showing another example of the control map utilized in the hybrid powered vehicle shown in FIG. 1.

FIG. 3 is a graph showing another example of the control map for the auxiliary acceleration in the running state of the hybrid powered vehicle. In FIG. 3, abscissa depicts rotation rate of the internal combustion engine and ordinate depicts output torque of the hybrid powered vehicle in the running state. When the charging rate of the storage battery is enough, the motor is controlled by the hybrid control circuit such that the output torque (kg/m) of the motor takes the hatched torque range in FIG. 3 in its charge corresponding to the rotation rate (rpm) of the internal combustion engine. It is also possible to set the rate of the auxiliary running by the motor in each of a plurality of modes by providing a corresponding number of control maps having different torque ranges to be covered by the motor correspondingly to the respective modes and by using optimal one of the control maps according to the charging rate of the storage battery.

In this embodiment of the present invention, it has been confirmed that a considerable effect is obtained in a region in which the vehicle speed is small, particularly, 20 km/h or lower. From a result of a comprehensive test of an experimental vehicle in standard running modes, it has been confirmed that a comprehensive fuel consumption rate is improved by about 6%.

Although, in the described embodiment, the single motor-generator is used as the electric rotary machine of the hybrid powered vehicle, it should be noted that the present invention can be generally utilized in hybrid powered vehicles having other constructions than the described construction. That is, the present invention can be applied, with similar effect, to a hybrid powered vehicle having other construction than the described embodiment, which is equipped with an internal combustion engine and a rotary machine includes an electric motor and an generator, which are provided individually and constructed in such a way that the motor assists the internal combustion engine. Further, control maps other than the described control maps may be designed correspondingly to respective constructions of hybrid powered vehicles.

What is claimed is:

1. A hybrid powered vehicle comprising:
    an internal combustion engine;
    an internal combustion engine control circuit for controlling flow rate of fuel supplied to said internal combustion engine;
    an AC electric motor having a rotary shaft coupled to a rotary shaft of said internal combustion engine;
    a storage battery;
    an inverter for inverting DC power of said storage battery into AC power and supplying the AC power to said electric motor; and
    a hybrid control circuit responsive to an electric signal indicative of pressing amount information of an accelerator pedal of said vehicle for controlling said inverter,
    wherein said control circuit comprises calculation means for calculating load sharing rates of said internal combustion engine and said electric motor on the basis of the pressing amount of said accelerator pedal, and means for supplying information corresponding to the load sharing rate of said internal combustion engine calculated by said calculation means to said internal combustion engine control circuit, and
    wherein said hybrid control circuit further includes; means for recognizing a charging rate of said storage battery; and means for, when the charging rate of said storage battery is larger than a predetermined value, increasing the load sharing rate of said electric motor to the maximum possible rate if the range of the pressing amount of said accelerator pedal is smaller than a predetermined value.

* * * * *